United States Patent
Ikeda

(10) Patent No.: US 7,656,443 B2
(45) Date of Patent: Feb. 2, 2010

(54) IMAGE PROCESSING APPARATUS FOR CORRECTING DEFECT PIXEL IN CONSIDERATION OF DISTORTION ABERRATION

(75) Inventor: Hideru Ikeda, Hachioji (JP)

(73) Assignee: Olympus Corporation, Tokyo (JP)

( * ) Notice: Subject to any disclaimer, the term of this patent is extended or adjusted under 35 U.S.C. 154(b) by 403 days.

(21) Appl. No.: 11/589,081

(22) Filed: Oct. 30, 2006

(65) Prior Publication Data
US 2007/0165119 A1    Jul. 19, 2007

(30) Foreign Application Priority Data
Nov. 1, 2005    (JP)    ............... 2005-318120

(51) Int. Cl.
*H04N 9/64* (2006.01)
(52) U.S. Cl. .................. 348/246; 348/247; 348/243; 348/251
(58) Field of Classification Search .................. 348/246
See application file for complete search history.

(56) References Cited
U.S. PATENT DOCUMENTS
2003/0025813 A1*    2/2003    Yoshiwara et al. .......... 348/246

2003/0218683 A1*    11/2003    Kurase ................... 348/335

FOREIGN PATENT DOCUMENTS
JP    10-233950 A    9/1998

* cited by examiner

*Primary Examiner*—Jason Chan
*Assistant Examiner*—Antoinette T Spinks
(74) *Attorney, Agent, or Firm*—Westerman, Hattori, Daniels & Adrian, LLP

(57) ABSTRACT

An image processing apparatus includes an optical system having distortion aberration characteristics for expanding a central part and compressing a peripheral part of an image plane; an image sensor for photodetecting an optical image via the optical system, converting the optical image to image signals, and outputting the image signals; a correction coefficient output circuit for outputting a correction coefficient for correcting the image signal with respect to a defect pixel of the image sensor, wherein the correction coefficient is determined based on the distortion aberration characteristics and a position of a peripheral pixel around the defect pixel; and a correction value computing circuit for computing a correction value with respect to the image signal of the defect pixel, based on the image signal of the peripheral pixel and the correction coefficient.

1 Claim, 16 Drawing Sheets

FIG. 6

|  | Pa2 | Pc2 | | Pe2 | | |
|---|---|---|---|---|---|---|
| R (a, 0) | Gr (b, 0) | R (c, 0) | Gr (d, 0) | R (e, 0) | Gr (f, 0) |
| Gb (a, 1) | B (b, 1) | Gb (c, 1) | B (d, 1) | Gb (e, 1) | B (f, 1) |
| R (a, 2) | Gr (b, 2) | R (c, 2) | Gr (d, 2) | R (e, 2) | Gr (f, 2) |
| Gb (a, 3) | B (b, 3) | Gb (b, 3) | B (d, 3) | Gb (e, 3) | B (f, 3) |
| R (a, 4) | Gr (b, 4) | R (c, 4) | Gr (d, 4) | R (e, 4) | Gr (f, 4) |
| Gb (a, 5) | B (b, 5) | Gb (c, 5) | B (d, 5) | Gb (e, 5) | B (f, 5) |

FIG. 7A

| (a, 0) | (b, 0) | (c, 0) | (d, 0) | (e, 0) | (f, 0) |
|---|---|---|---|---|---|
| (a, 1) | (b, 1) | (c, 1) | (d, 1) | (e, 1) | (f, 1) |
| (a, 2) | (b, 2) | (c, 2) | (d, 2) | (e, 2) | (f, 2) |
| (a, 3) | (b, 3) | (b, 3) | (d, 3) | (e, 3) | (f, 3) |
| (a, 4) | (b, 4) | (c, 4) | (d, 4) | (e, 4) | (f, 4) |
| (a, 5) | (b, 5) | (c, 5) | (d, 5) | (e, 5) | (f, 5) |

| (a, 0) | (b, 0) | (c, 0) | (d, 0) | (e, 0) | (f, 0) |
|---|---|---|---|---|---|
| (a, 1) | (b, 1) | (c, 1) | (d, 1) | (e, 1) | (f, 1) |
| (a, 2) | (b, 2) | (c, 2) | (d, 2) | (e, 2) | (f, 2) |
| (a, 3) | (b, 3) | (b, 3) | (d, 3) | (e, 3) | (f, 3) |
| (a, 4) | (b, 4) | (c, 4) | (d, 4) | (e, 4) | (f, 4) |
| (a, 5) | (b, 5) | (c, 5) | (d, 5) | (e, 5) | (f, 5) |

IMAGE PROCESSING APPARATUS FOR CORRECTING DEFECT PIXEL IN CONSIDERATION OF DISTORTION ABERRATION

BACKGROUND OF THE INVENTION

1. Field of the Invention

The present invention relates to an image processing apparatus, and in particular, an image processing apparatus for correcting an image signal having a defect caused by a pixel defect existing in an image sensor.

Priority is claimed on Japanese Patent Application No. 2005-318120, filed Nov. 1, 2005, the content of which is incorporated herein by reference.

2. Description of the Related Art

In image input apparatuses such as video cameras or digital cameras, a zoom function is widely used for freely expanding or contracting the image in accordance with the distance to a subject to be photographed, or the size of the subject in the angular field. The zoom function is classified into: (i) optical zooming generally implemented by mechanically moving internal lenses, and (ii) electronic zooming for performing image expansion by using a part of the image output from the image sensor and interpolating new pixels between existing pixels so as to generate an interpolated image. In comparison with the optical zooming, the electronic zooming includes no elements to be driven, and can be realized as a small device at low cost; however, image quality thereof is inferior.

With respect to such a problem, Japanese Unexamined Patent Application, First Publication No. H10-233950 discloses an electronic zoom image input system having: a fixed-focal-length image input optical system for compressing a periphery of an input image; and a light receiving element, having a substantially uniform pixel density, for photo-detecting the input image. This electronic zoom image input system has a function of correcting and converting the image which is detected by the light receiving element and includes distortion due to the above compression, thereby producing a zoom image of high quality. In accordance with this system, for both wide-area imaging and telephoto imaging, it is possible to obtain an image in which the central part is less degraded while degradation of the peripheral part is inevitable.

As the image sensor in a video camera or a digital camera, a CMOS (complementary MOS) image sensor or a CCD (charge coupled device) image sensor is popularly used. Such an image sensor may include dust particles in a manufacturing process, or may be affected by radiation after manufacturing, which may cause defect pixels appearing when there is excessive dark current, abnormal signal readout from the pixels, excessive insufficiency of pixel sensitivity, or the like. Conventionally, when such defect pixels are produced, they are corrected by linear interpolation using peripheral pixels around each defect pixel.

SUMMARY OF THE INVENTION

The present invention provides an image processing apparatus comprising:

an optical system having distortion aberration characteristics for expanding a central part and compressing a peripheral part of an image plane;

an image sensor for photodetecting an optical image via the optical system, converting the optical image to image signals, and outputting the image signals;

a correction coefficient output circuit for outputting a correction coefficient for correcting the image signal with respect to a defect pixel of the image sensor, wherein the correction coefficient is determined based on the distortion aberration characteristics and a position of a peripheral pixel around the defect pixel; and a correction value computing circuit for computing a correction value with respect to the image signal of the defect pixel, based on the image signal of the peripheral pixel and the correction coefficient.

In a typical example, the correction coefficient output circuit includes:

a defect pixel detection circuit for detecting the defect pixel;

a peripheral pixel position output circuit for outputting the position of the peripheral pixel with respect to the detected defect pixel;

an area discrimination circuit for outputting an area discrimination signal for indicating which of image areas the peripheral pixel belongs to based on the position of the peripheral pixel, wherein the image areas are defined by area division in accordance with the distortion aberration characteristics; and an area correction coefficient selecting circuit for outputting the correction coefficient corresponding to the area discrimination signal, from among the correction coefficients assigned to the image areas.

In a preferable example of this case, the image processing apparatus further comprise:

a correction coefficient recomputation circuit for computing the correction coefficient assigned to a divided area obtained by further dividing an image area into smaller areas, based on the correction coefficient output from the area correction coefficient selecting circuit; and a correction coefficient selecting circuit for selecting one of the correction coefficient output from the area correction coefficient selecting circuit and the correction coefficient output from the correction coefficient recomputation circuit, based on the position of the peripheral pixel.

In another preferable example:

the correction value computing circuit functions as a first correction value computing circuit, and the image processing apparatus further comprises:

a second correction value computing circuit for computing the correction value based on a pixel value of the peripheral pixel, without using the correction coefficient; and a correction value selecting circuit for selecting one of the correction value output from the first correction value computing circuit and the correction value output from the second correction value computing circuit, based on the position of the peripheral pixel.

The second correction value computing circuit may have:

a pixel selecting circuit for selecting specific peripheral pixels from among peripheral pixels around the defect pixel; and a defect pixel average correction circuit for computing an average of the image signals of the selected peripheral pixels, and outputting the average as the correction value.

Instead, the second correction value computing circuit may have:

a pixel selecting circuit for selecting a specific one of peripheral pixels around the defect pixel; and a defect pixel substitution correction circuit for outputting the image signal of the selected peripheral pixel as the correction value.

The present invention also provides an image processing apparatus comprising:

an optical system having distortion aberration characteristics for expanding a central part and compressing a peripheral part of an image plane;

an image sensor for photodetecting an optical image via the optical system, converting the optical image to image signals, and outputting the image signals;

a defect pixel detection circuit for detecting a defect pixel;

a peripheral pixel position output circuit for outputting positions of peripheral pixels with respect to the detected defect pixel;

a characteristic value output circuit for outputting characteristic values assigned to the defect pixel and the peripheral pixels with respect to the distortion aberration characteristics;

a pixel selecting circuit for comparing the characteristic values of the defect pixel and each peripheral pixel with each other, and selecting one of the peripheral pixels which has the characteristic value producing the minimum difference between it and the characteristic value of the defect pixel; and a correction value computing circuit for substituting the image signal of the peripheral pixel selected by the pixel selecting circuit for the image signal with respect to the defect pixel, so as to correct this image signal of the defect pixel.

BRIEF DESCRIPTION OF THE DRAWINGS

FIG. 6 is a diagram used for explaining defect pixel correction.

FIG. 7A is a diagram used for explaining a defect pixel and its peripheral pixels with respect to an optical system having no distortion aberration, and FIG. 7B is a diagram used for explaining a defect pixel and its peripheral pixels with respect to an optical system having a distortion aberration.

FIGS. 20A and 20B are diagrams used for explaining another example of the correction value computation performed by the second correction value computing circuit in the third embodiment.

DESCRIPTION OF THE PREFERRED EMBODIMENTS

Hereinafter, embodiments according to the present invention will be described with reference to the appended figures.

First Embodiment

Figure 1:
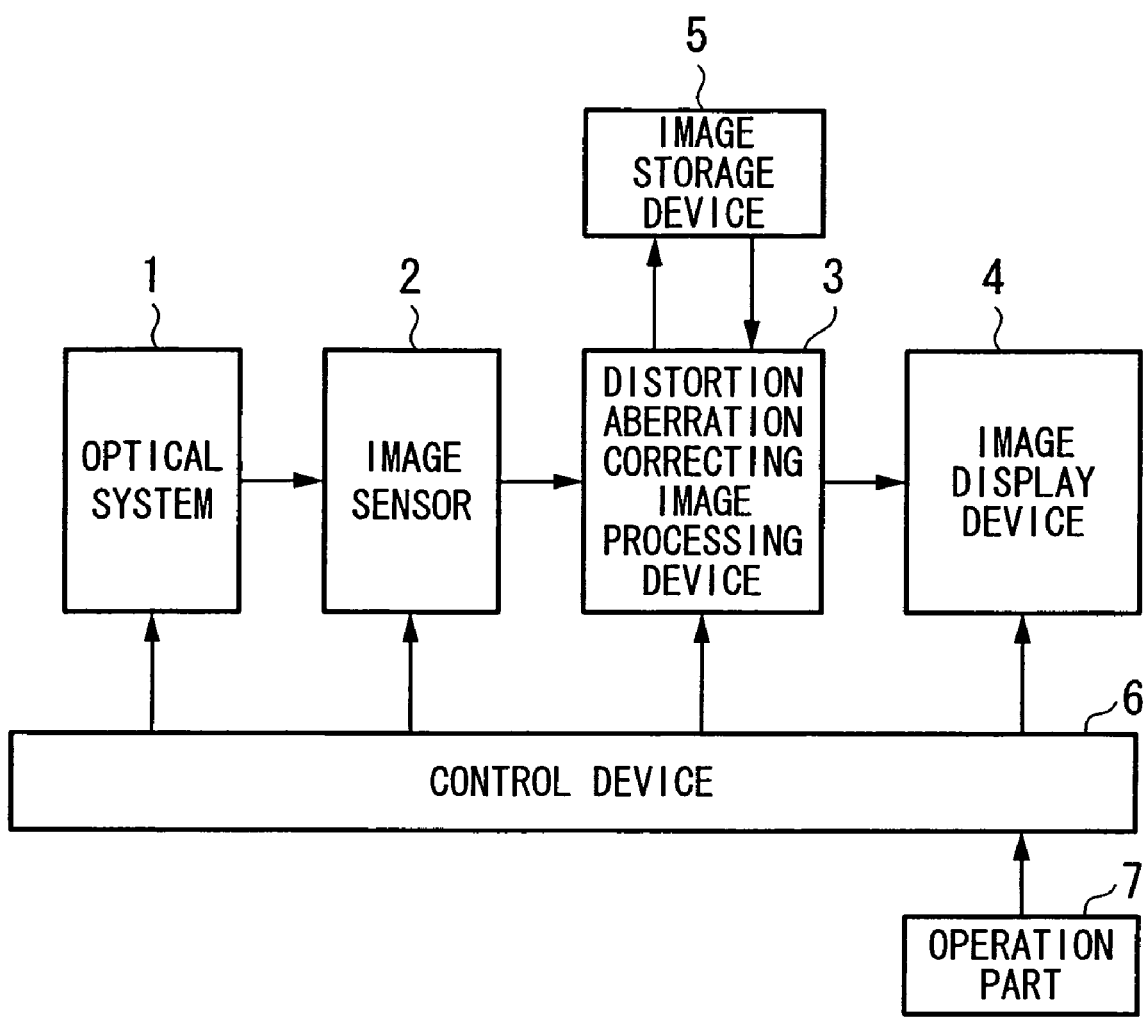
FIG. 1 is a block diagram showing the general structure of an example of the image capturing apparatus to which the present invention is applied.
Figure 2:
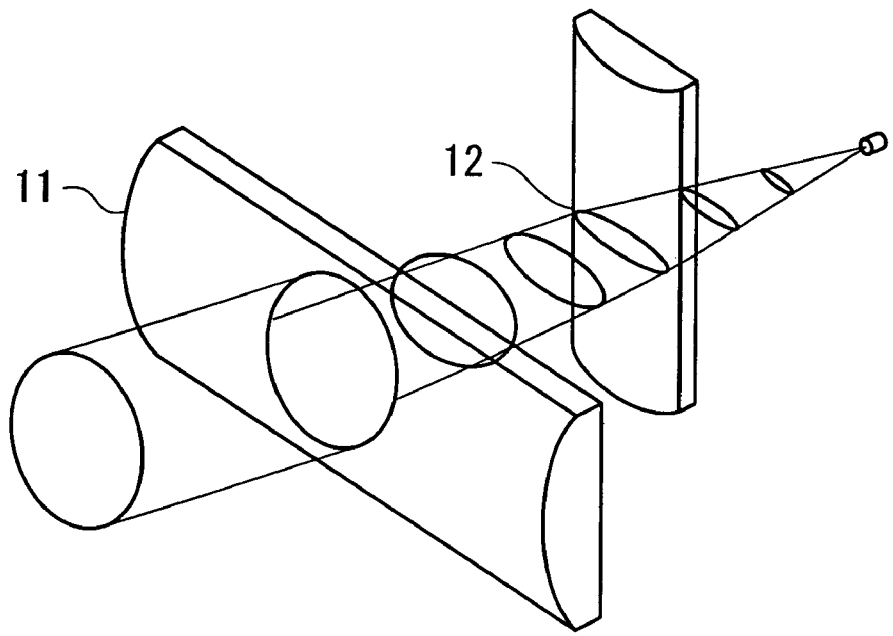
FIG. 2 is a perspective view used for explaining an optical system having a distortion aberration.

FIG. 1 is a block diagram showing the general structure of an image capturing apparatus to which the present invention is applied. In FIG. 1, reference numeral 1 indicates an optical system. The optical system 1 has a distortion aberration for expanding a central part and compressing a peripheral part of an object to be photographed. That is, as shown in FIG. 2, the optical system 1 is formed by combining a usual optical system and cylindrical lenses 11 and 12 which are arranged perpendicularly to each other, so that it has a distortion aberration.

An optical image from the optical system 1 is further projected onto a photodetective surface of an image sensor 2 which may be a CMOS (complementary MOS) image sensor or a CCD (charge coupled device) image sensor. On a front face (i.e., the photodetective surface) of the image sensor 2, RGB color filters may be arranged in a Bayer arrangement.

Figure 3A:
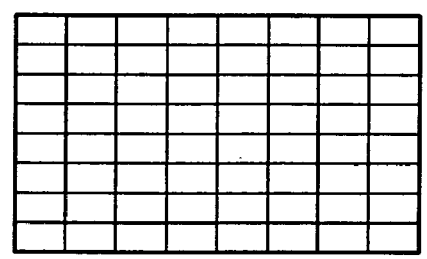
FIGS. 3A and 3B are diagrams used for explaining an optical system having a distortion aberration.
Figure 3B:
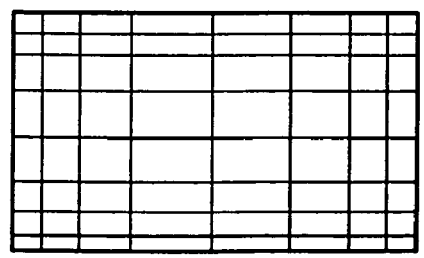

In the image sensor 2, the optical image from the optical system 1 is subjected to photoelectric conversion. When the optical system 1 has the above-described distortion aberration, a subject image as shown in FIG. 3A is detected as image signals having distortion as shown in FIG. 3B. Accordingly, through the optical system having a distortion aberration, the periphery of the subject image is compressed; thus, in order to obtain an electronic zoom image of the same angular field as that of an optical system having no distortion aberration, an image area allocated to peripheral pixels of the image sensor 2 (i.e., an image area which should be detected by the peripheral pixels) is increased.

Figure 4:
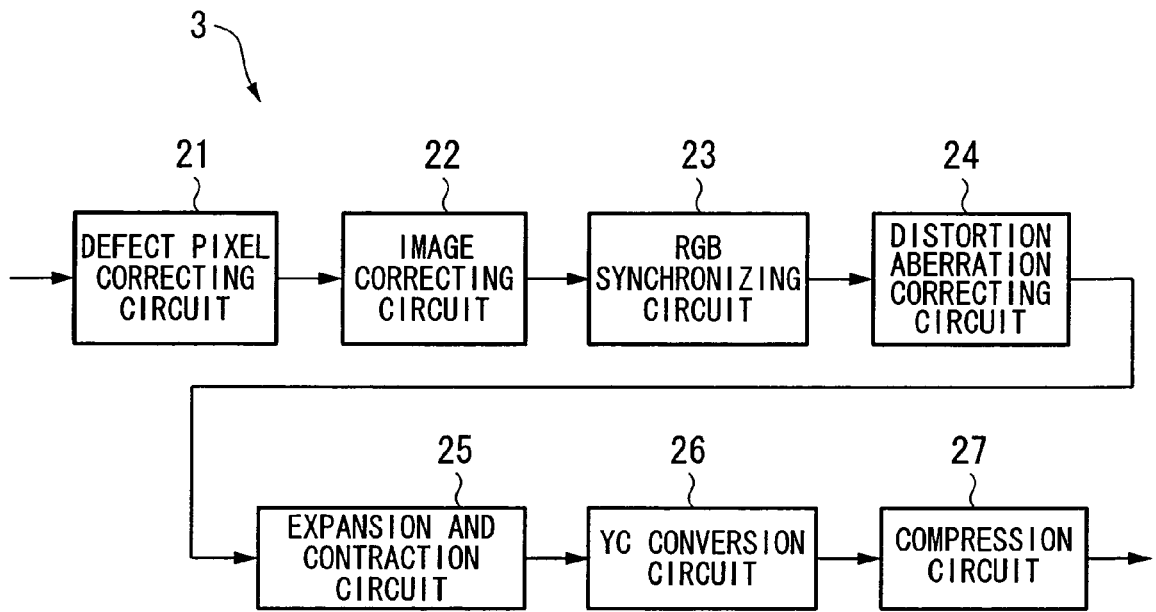
FIG. 4 is a block diagram showing an example of the distortion aberration correcting image processing device in the image capturing apparatus to which the present invention is applied.

Signals output from the image sensor 2 are sent to a distortion aberration correcting image processing device 3. As shown in FIG. 4, the distortion aberration correcting image processing device 3 has a defect pixel correcting circuit 21, an image correcting circuit 22, an RGB synchronizing circuit 23, a distortion aberration correcting circuit 24, an expansion and contraction circuit 25, a YC conversion circuit 26, and a compression circuit 27.

In FIG. 4, each image signal from the image sensor 2 is sent to the defect pixel correcting circuit 21. The defect pixel correcting circuit 21 performs correction of each defect pixel of the image sensor 2. As explained in detail later, in this first embodiment of the present invention, defect correction is performed in consideration of the optical system 1 which causes a distortion aberration.

Each signal output from the defect pixel correcting circuit 21 is supplied to the image correcting circuit 22 which performs image correcting processes such as white balance correction, shading correction, and the like.

Each signal output from the image correcting circuit 22 is supplied to the RGB synchronizing circuit 23. The RGB synchronizing circuit 23 performs a process of interpolating the data of each color, which is applied to relevant image signals of the RGB Bayer arrangement, so as to synchronize R, G, and B color signals.

Each signal output from the RGB synchronizing circuit 23 is supplied to the distortion aberration correcting circuit 24 which corrects the distortion aberration caused by the optical system 1.

Each signal output from the distortion aberration correcting circuit 24 is supplied to the expansion and contraction circuit 25 which expands or contracts the image to a desired size.

Each signal output from the expansion and contraction circuit 25 is supplied to the YC conversion circuit 26 which performs conversion from the RGB signals to brightness signals (Y) and color difference (or color component) signals (Cr and Cb).

Each signal output from the YC conversion circuit 26 is supplied to the compression circuit 27 which performs the compressive encoding of each image signal using JPEG (joint photographic experts group) format or the like.

In FIG. 1, each image signal output from the distortion aberration correcting image processing device 3 is sent to an image storage device 5 which stores the image signal. In addition, image signals based on the image obtained by the camera are sent to an image display device 4 so as to display a monitor image on the image display device 4.

A control device 6 controls the optical system 1, the image sensor 2, the distortion aberration correcting image processing device 3, and the image display device 4. An operation part 7 includes buttons and switches for operating the camera, and also includes a data display part.

Figure 5:
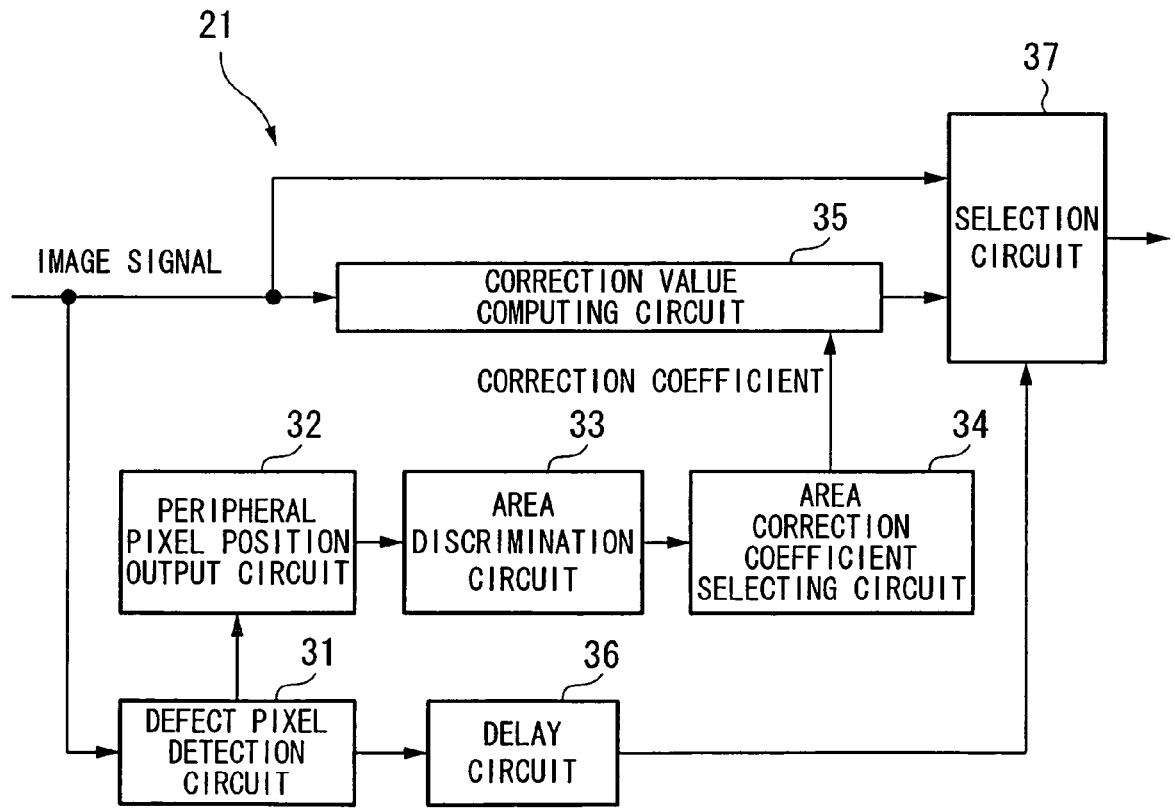
FIG. 5 is a block diagram showing the defect pixel correcting circuit as a first embodiment in accordance with the present invention.

FIG. 5 is a block diagram showing the structure of the defect pixel correcting circuit 21, as the first embodiment of the image processing apparatus of the present invention. The defect pixel correcting circuit 21 consists of a defect pixel detection circuit 31, a peripheral pixel position output circuit 32, an area discrimination circuit 33, an area correction coefficient selecting circuit 34, a correction value computing circuit 35, a delay circuit 36, and a selection circuit 37.

In FIG. 5, an input image signal is supplied to the selection circuit 37 and the correction value computing circuit 35, and data relating to the pixel of the input image signal is supplied to the defect pixel detection circuit 31. In the defect pixel detection circuit 31, position data of each defect pixel is stored, which is obtained by a pre-shipment test of the image sensor 2, or in an automatic defect pixel detection process for detecting each defect pixel generated later. When the defect pixel detection circuit 31 detects that the position of the input image signal corresponds to any defect pixel, it sends an address corresponding to the position of the relevant defect pixel to the peripheral pixel position output circuit 32.

The peripheral pixel position output circuit 32 stores peripheral pixel position data used for correcting the image signal with respect to each defect pixel, where the positions of the peripheral pixels are made correspondent to the defect pixel. When the address corresponding to the defect pixel is sent from the defect pixel detection circuit 31 to the peripheral pixel position output circuit 32, position data of the peripheral pixels used for correcting the image signal with respect to the target defect pixel is output from the peripheral pixel position output circuit 32.

The signal output from the peripheral pixel position output circuit 32 is supplied to the area discrimination circuit 33 which determines the area to which each peripheral pixel belongs. Based on this determination, an area discrimination signal is output from the area discrimination circuit 33 to the area correction coefficient selecting circuit 34.

As explained in detail later, in the first embodiment of the present invention, the image plane is divided into areas based on characteristic values of the distortion aberration characteristics, and a correction coefficient (or factor) is provided to each area. The area correction coefficient selecting circuit 34 has a correction coefficient table which stores correction coefficients respectively corresponding to the areas divided in accordance with the characteristic values of the distortion aberration characteristics. Additionally, in accordance with the area discrimination signal output from the area discrimination circuit 33, a correction coefficient corresponding to the target area is read from the correction coefficient table of the area correction coefficient selecting circuit 34, and is output from the area correction coefficient selecting circuit 34. This correction coefficient is sent to the correction value computing circuit 35.

The correction value computing circuit 35 computes a correction value based on the input image signal and each relevant correction coefficient sent from the area correction coefficient selecting circuit 34. This correction value is sent to the selection circuit 37.

When processing the image signal with respect to each defect pixel, a selection signal is output from the area correction coefficient selecting circuit 34, which is supplied via the delay circuit 36 to the selection circuit 37. The delay circuit 36 is provided for adjusting timing in consideration of a delay corresponding to the processing time necessary for computing the correction value. When no defect pixel occurs, the input image signal is directly output from the selection circuit 37. When a defect pixel occurs, the correction value obtained by the defect correction in the correction value computing circuit 35 is output from the selection circuit 37.

As described above, in the defect pixel correcting circuit 21 of the first embodiment, the image plane is divided into areas in accordance with the characteristic values of the distortion aberration characteristics. The area correction coefficient selecting circuit 34 has the correction coefficient table which stores correction coefficients respectively corresponding to these areas. The area discrimination circuit 33 determines the area to which each relevant peripheral pixel belongs, and based on this determination, a correction coefficient corresponding to this area is read from the correction coefficient table of the area correction coefficient selecting circuit 34. In the correction value computing circuit 35, a correction value for defect correction is computed using this correction coefficient in consideration of the distortion aberration. Accordingly, even when using the optical system 1 having a distortion aberration, defect pixel correction can be performed with high accuracy.

Below, defect correction of the first embodiment will be explained in detail. In this embodiment, the image sensor 2 having the Bayer arrangement is used, by which an image as shown in FIG. 6 is obtained.

In FIG. 6, it is assumed that the pixel at the coordinate (c, 2) is a defect pixel. This pixel belongs to the R color; thus, it is interpolated using data of peripheral pixels of the R color around this defect pixel, for example, using data of two peripheral pixels. In this case, an interpolated value iPc2 for the pixel (whose original pixel value is Pc2) at the coordinate (c, 2) is computed by linear interpolation using a pixel value Pa2 at the coordinate (a, 2) and a pixel value Pe2 at the coordinate (e, 2), as follows:

$$iPc2=(Pa2+Pe2)/2 \tag{1}$$

As described above, in the first embodiment of the present invention, the optical system 1 has the distortion aberration. When there is no distortion aberration, the area allocated to each pixel of the image sensor 2 is uniform as shown in FIG. 7A. However, when using the optical system 1 having the distortion aberration, the area allocated to each pixel of the image sensor 2 is not uniform as shown in FIG. 7B.

As shown in FIG. 7A, when there is no distortion aberration and the area allocated to each pixel of the image sensor 2 is uniform, the defect pixel can be corrected by linear interpolation based on the above formula (1). However, as shown in FIG. 7B, when there is an optical distortion aberration and the area allocated to each pixel of the image sensor 2 is not uniform, an accurate correction value cannot be obtained using the above formula (1).

Figure 8A:
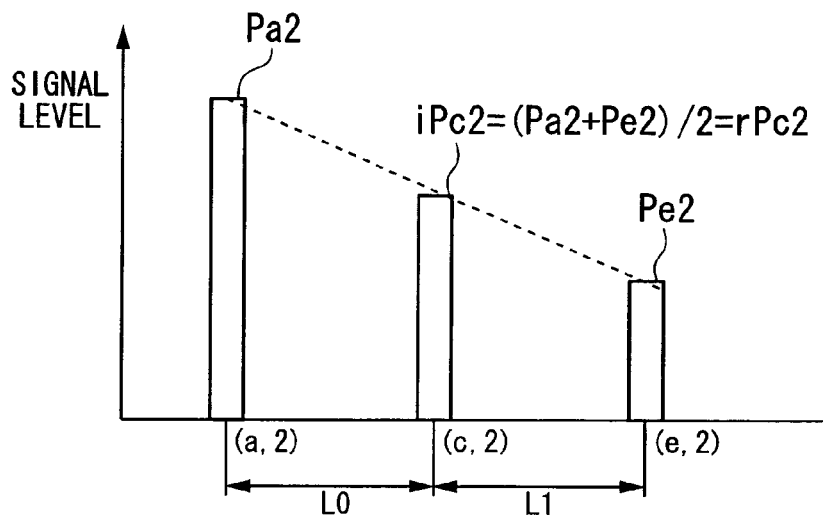
FIGS. 8A to 8C are diagrams used for explaining defect pixel correction performed in the first embodiment.
Figure 8B:
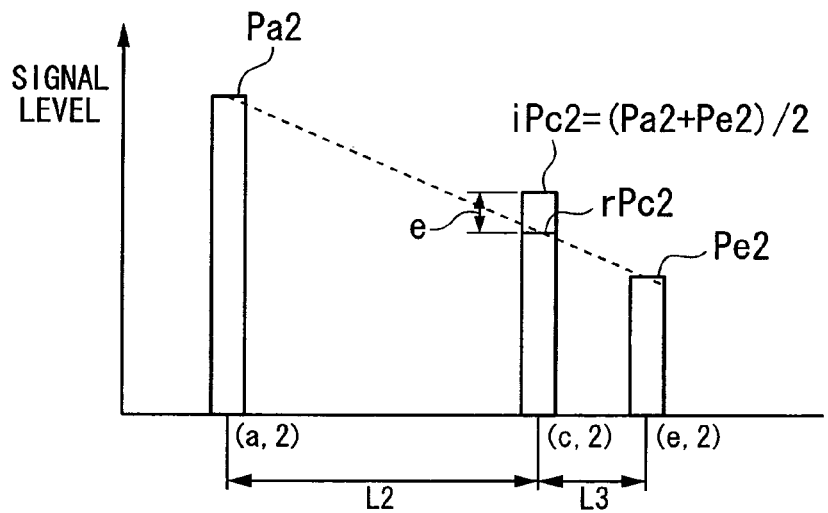
Figure 8C:
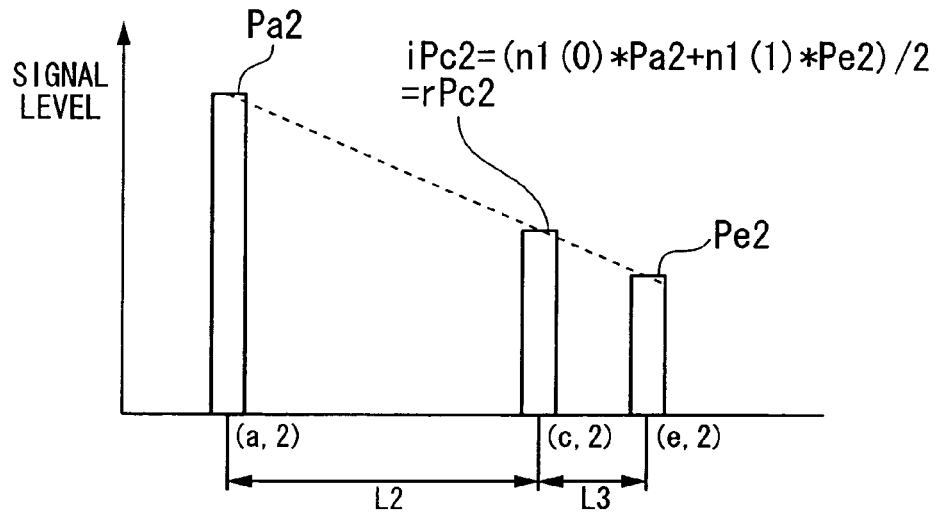

FIGS. 8A to 8C explain the above. FIG. 8A shows a case in which the optical system has no distortion aberration and the areas (see L0 and L1) allocated to each pixel of the image sensor 2 are uniform. In this case, when the interpolated pixel value iPc2 at the coordinate (c, 2) is computed based on the formula (1) by using the pixel value Pa2 at the coordinate (a, 2) and the pixel value Pe2 at the coordinate (e, 2), it substantially coincides with a pixel value rPc2 which should be originally assigned to the coordinate (c, 2).

In contrast, FIG. 8B shows a case in which the optical system 1 having distortion aberration is used, and thus the areas (see L2 and L3) allocated to each pixel of the image sensor 2 is not uniform. In this case, when the interpolated pixel value iPc2 at the coordinate (c, 2) is computed based on the formula (1) by using the pixel value Pa2 at the coordinate (a, 2) and the pixel value Pe2 at the coordinate (e, 2), there is an error "e" between the computed pixel value iPc2 and the pixel value rPc2 which should be originally assigned to the coordinate (c, 2).

Therefore, in the first embodiment of the present invention, as shown in FIG. 8C, correction coefficients in accordance with the characteristic values of the distortion aberration characteristics are assigned to each relevant area of the image plane, and are respectively multiplied to the corresponding pixel values so as to prevent such an error.

That is, in the first embodiment, correction coefficients n1(0) and n1(1) are respectively assigned to the coordinates (a, 2) and (e, 2), and the interpolated pixel value iPc2 at the coordinate (c, 2) is computed based on the following formula by using the pixel value Pa2 at the coordinate (a, 2), the pixel value Pe2 at the coordinate (e, 2), and the above correction coefficients:

$$iPc2=(n1(0)\times Pa2+n1(1)\times Pe2)/2 \tag{2}$$

When the respective distortion aberration characteristic values of the coordinates (a, 2) and (e, 2) are Ka and Ke, the correction coefficient n1(0) can be computed as:

$$n1(0)=Ke/(Ka+Ke) \tag{3}$$

Similarly, the correction coefficient n1(1) can be computed as:

$$n1(1)=Ka/(Ka+Ke) \tag{4}$$

The characteristic value of the distortion aberration indicates the degree of distortion aberration, and is large in a peripheral part of the image plane. That is, the characteristic value of the distortion aberration corresponds to the area allocated to each pixel of the image sensor; thus, the larger the characteristic value, the larger the area allocated to the corresponding pixel.

As discussed above, when using the optical system 1 having the distortion aberration, the correction coefficients to be multiplied by the corresponding pixel values are determined in accordance with the characteristic values of the distortion aberration, which results in defect correction having no error.

Figure 9:
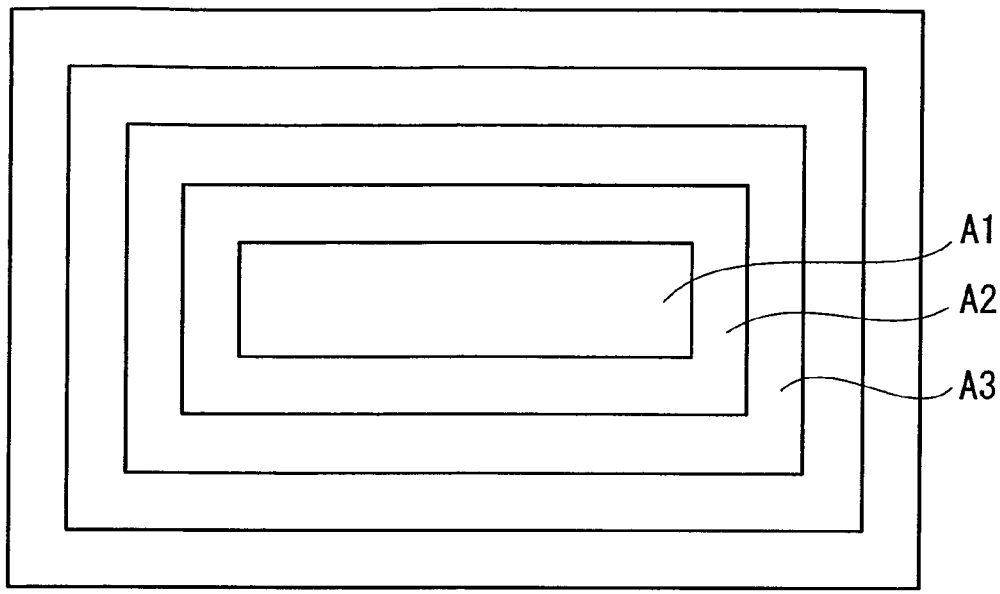
FIG. 9 is a diagram used for explaining area division performed in the first embodiment.
Figure 10:
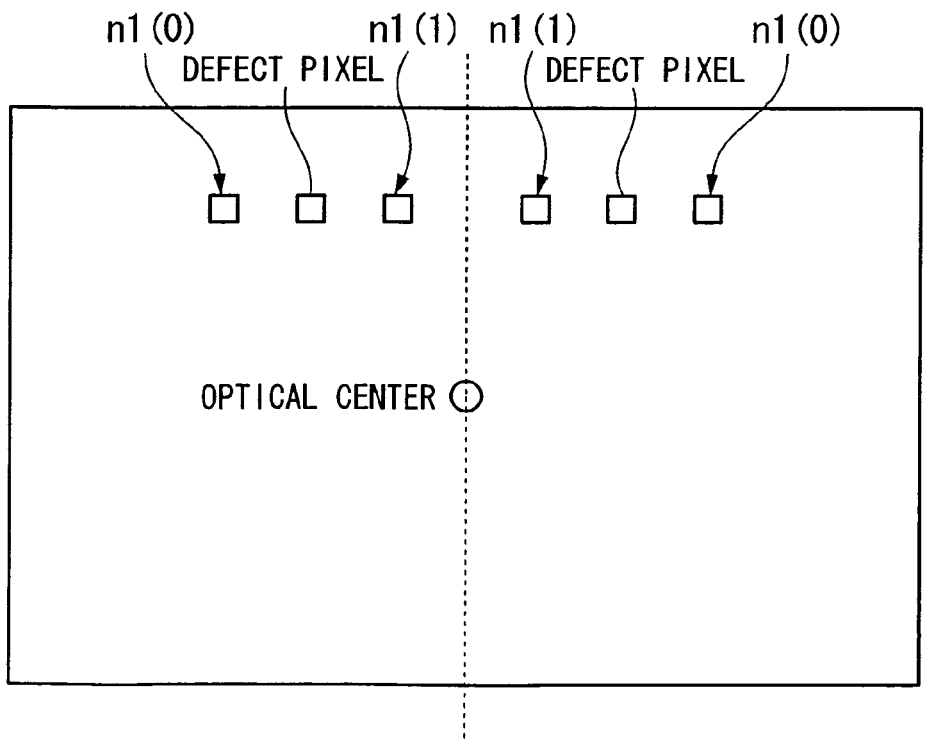
FIG. 10 is a diagram used for explaining correction coefficients defined due to the area division in the first embodiment.

As described above in the first embodiment, the image plane is divided into areas in accordance with the characteristic values of the distortion aberration characteristics. FIG. 9 shows an example of such a division of the image plane into a plurality of areas. In an example of the area division method in accordance with the distortion aberration characteristics, upper and lower thresholds of the characteristic value of the distortion aberration characteristics are determined for each area to be divided, and each divided area is determined in accordance with each range defined by the upper and lower thresholds. As shown in FIG. 10, the correction coefficients n1(0) and n1(1) are defined to provide a line symmetrical relationship with respect to the optical center.

Figure 11:
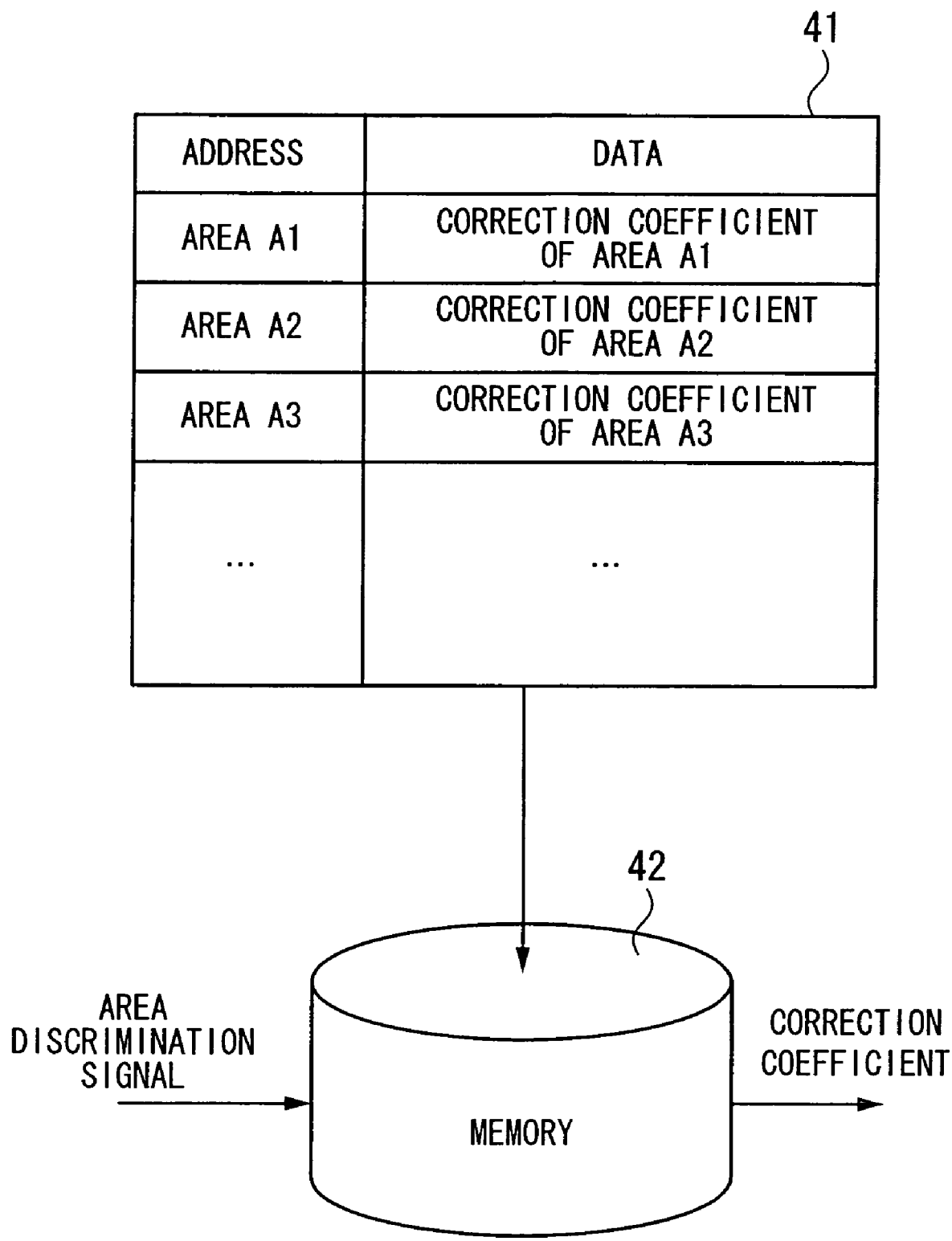
FIG. 11 is a diagram used for explaining the correction coefficient table employed in the first embodiment.

The area correction coefficient selecting circuit 34 shown in FIG. 5 has a correction coefficient table 41 (see FIG. 11) prepared by the above process. As shown in FIG. 11, the correction coefficient table 41 is stored in a memory 42 such as an SDRAM (synchronous dynamic random access memory).

Figure 12:
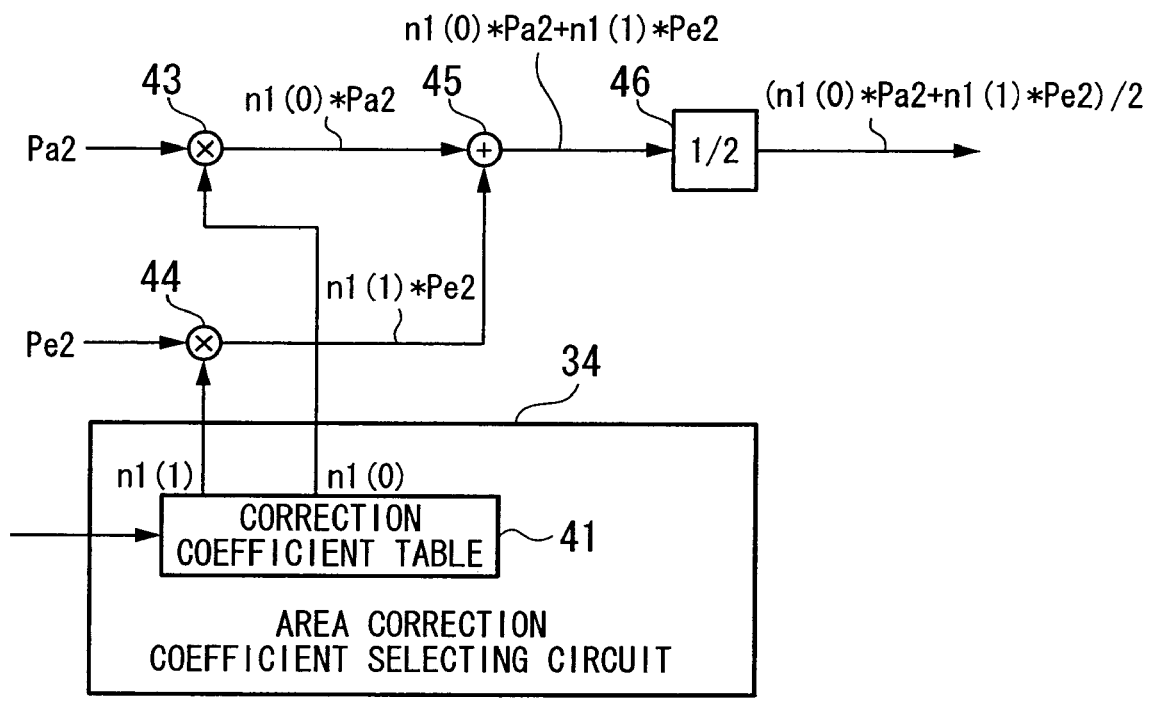
FIG. 12 is a diagram used for explaining correction value computation performed in the first embodiment.

As shown in FIG. 12, the correction value computing circuit 35 (see FIG. 5) has multipliers 43 and 44, an adder 45, and a divider 46.

For example, if the pixel at the coordinate (c, 2) is a defect pixel, the correction coefficients n1(0) and n1(1) are retrieved from the correction coefficient table 41, and the pixel value Pa2 at the coordinate (a, 2) and the pixel value Pe2 at the coordinate (e, 2) are respectively supplied to the multipliers 43 and 44.

The multiplier 43 multiplies the pixel value Pa2 by the correction coefficient n1(0), and the multiplier 44 multiplies the pixel value Pe2 by the correction coefficient n1(1). The output signal (i.e., n1(0)×Pa2) from the multiplier 43 and the output signal (i.e., n1(1)×Pe2) from the multiplier 44 are added to each other by the adder 45. The output signal (i.e., n1(0)×Pa2+n1(1)×Pe2) from the adder 45 is supplied to the divider 46, from which the interpolated pixel value iPc2 (=(n1(0)×Pa2+n1(1)×Pe2)/2) is output. This divider 46 executes a division of "½"; thus, it can be implemented by a bit-shift operation.

As described above, in the defect pixel correcting circuit 21 of the first embodiment, the image plane is divided into areas in accordance with the characteristic values of the distortion aberration characteristics, and correction coefficients corresponding to the divided areas are stored in the correction coefficient table 41. It is then determined to which area the position of each relevant peripheral pixel belongs. Based on this determination, the correction coefficient corresponding to each determined area is read from the correction coefficient table 41, and the correction value for defect correction is computed by multiplying each correction coefficient by the corresponding pixel value.

Accordingly, even when using the optical system 1 having the distortion aberration, defect pixel correction can be performed with high accuracy.

Second Embodiment

Figure 13:
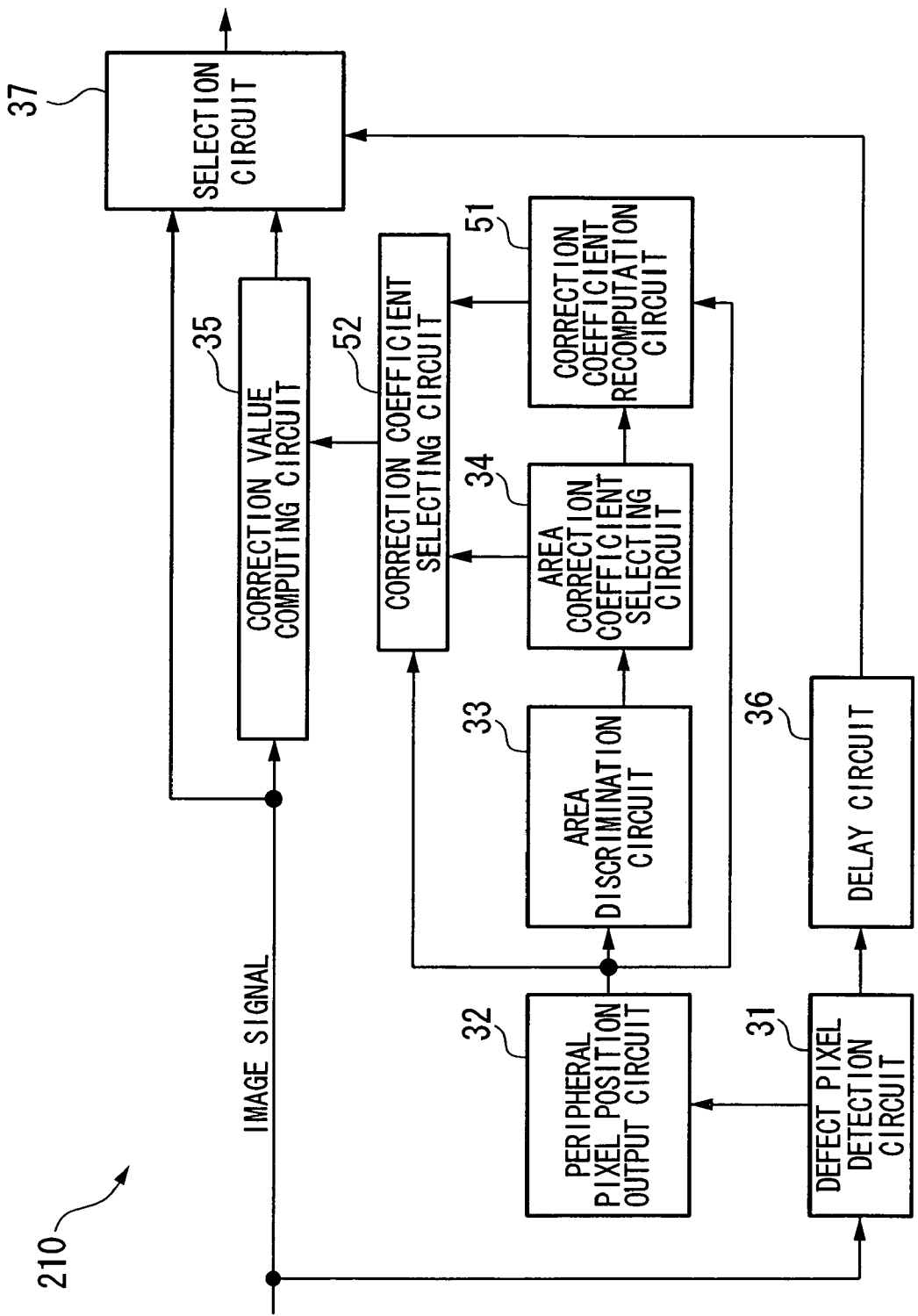
FIG. 13 is a block diagram showing the defect pixel correcting circuit as a second embodiment in accordance with the present invention.

FIG. 13 is a block diagram showing the structure of a defect pixel correcting circuit 210 as a second embodiment of the present invention. The general structure of the image capturing apparatus of the present embodiment is similar to that of the first embodiment, and parts identical to those of the first embodiment are given identical reference numerals. Therefore, explanations thereof are omitted.

In the second embodiment, a correction coefficient recomputation circuit 51 and a correction coefficient selecting circuit 52 are added to the defect pixel correcting circuit 21 shown in FIG. 5. The correction coefficient recomputation circuit 51 computes a recomputed correction coefficient by extrapolation in accordance with the characteristic values of the distortion aberration characteristics. The correction coefficient selecting circuit 52 selects and outputs one of (i) the correction coefficient assigned to the relevant area, supplied from the area correction coefficient selecting circuit 34, and (ii) the recomputed correction coefficient computed by the correction coefficient recomputation circuit 51, in accordance with the position of each peripheral pixel, which is output from the peripheral pixel position output circuit 32.

Figure 14:
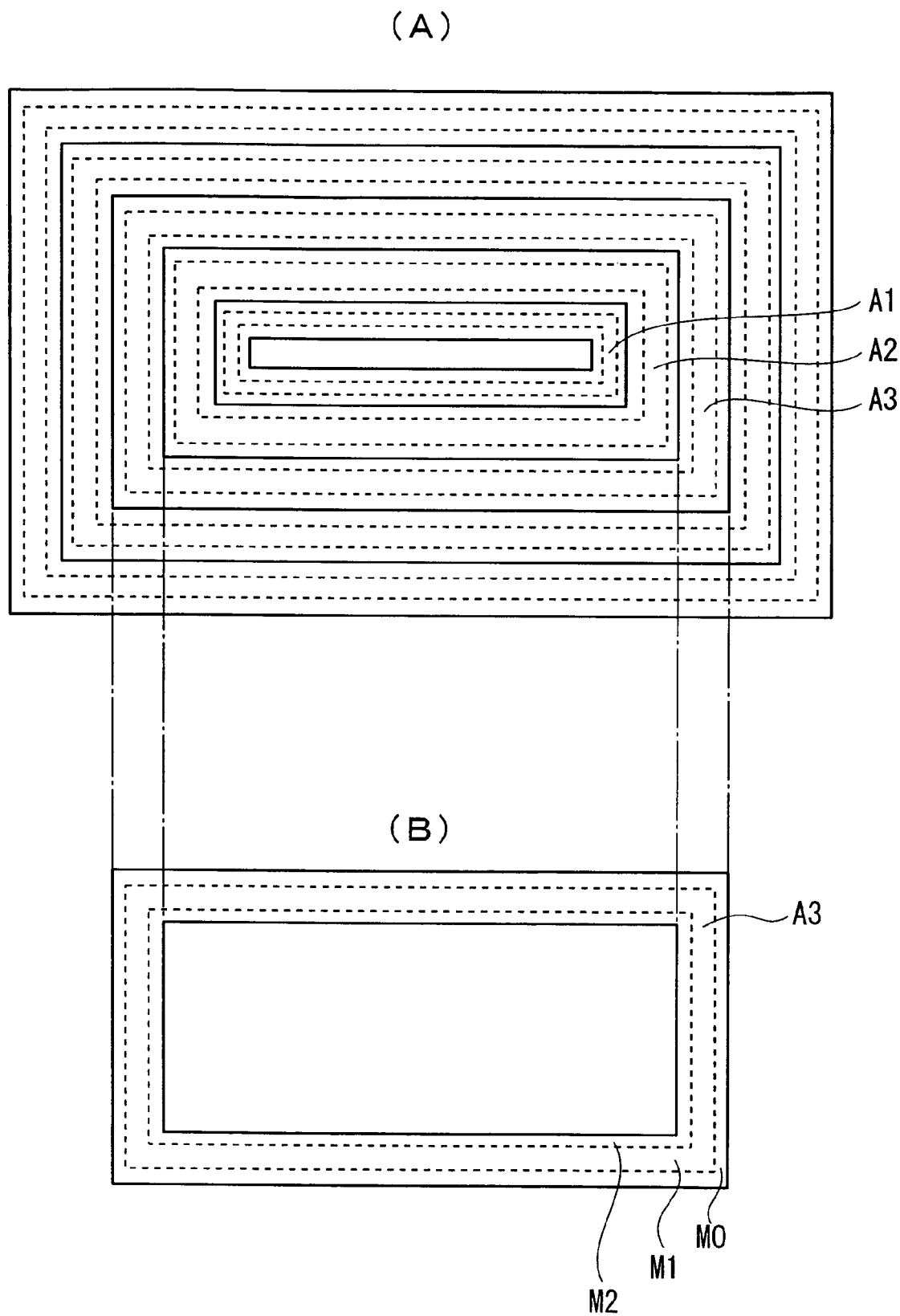
FIG. 14 is a diagram used for explaining area division and areas formed by further area division performed in the second embodiment.

The defect correction of the second embodiment will be further explained. As shown in part (A) in FIG. 14, the image plane is divided into areas A1, A2, A3, ... in accordance with the characteristic values of the distortion aberration characteristics. Similar to the first embodiment, the correction coefficients respectively assigned to the areas A1, A2, A3, etc., are stored in the correction coefficient table in the area correction coefficient selecting circuit 34. Each of these areas A1, A2, A3, etc., is further divided into smaller areas. In part (B) in FIG. 14, the area A3 may be divided into three areas M0, M1, and M2. The other areas are also divided similarly.

When each area is divided into three smaller areas M0, M1, and M2, the correction coefficients respectively assigned to these divided areas are determined as follows:

First, when the correction coefficient of the area (before division) is nM, it is determined that the correction coefficient nM_1 assigned to the center area M1 among the areas M0, M1, and M2 is identical to this correction coefficient nM, that is:

$$nM\_1 = nM \quad (5)$$

The correction coefficient nM_0 assigned to the area M0 is computed based on the following formula, using the correction coefficient nM of the relevant area (before division) and the characteristic values of the distortion aberration assigned to each area (here, characteristic values M0_d, M1_d, and M2_d respectively assigned to the areas M0, M1, and M2):

$$nM\_0 = nM \times (M0\_d / M1\_d) \quad (6)$$

Here, the above characteristic values of the distortion aberration are computed based on the distortion aberration characteristics of the present optical system and positional data of each area.

Similarly, the correction coefficient nM_2 assigned to the area M2 is computed based on the following formula, using the correction coefficient nM of the relevant area (before division) and the characteristic values (M0_d, M1_d, and M2_d) of the distortion aberration assigned to each area:

$$nM\_2 = nM \times (M2\_d / M1\_d) \quad (7)$$

In the structure of the defect pixel correcting circuit 210 (shown in FIG. 13) of the second embodiment, when a defect pixel is detected by the defect pixel detection circuit 31, the address corresponding to the position of the defect pixel is sent from the defect pixel detection circuit 31 to the peripheral pixel position output circuit 32. Then, the position data of each peripheral pixel used for correcting the defect pixel is output from the peripheral pixel position output circuit 32 to the area discrimination circuit 33.

The area discrimination circuit 33 determines the area to which each peripheral pixel belongs, and based on the determination, the area discrimination signal is output from the area discrimination circuit 33 to the area correction coefficient selecting circuit 34. Accordingly, a correction coefficient corresponding to each discriminated area is retrieved from the correction coefficient table of the area correction coefficient selecting circuit 34. The correction coefficient of each relevant area is sent to the correction coefficient selecting circuit 52 and also to the correction coefficient recomputation circuit 51.

Based on the signal output from the peripheral pixel position output circuit 32, the correction coefficient recomputation circuit 51 divides each area into further divided areas, and computes correction coefficients respectively assigned to the divided areas. The correction coefficient of each divided area is sent to the correction coefficient selecting circuit 52.

With respect to each peripheral pixel, based on the position thereof output from the peripheral pixel position output circuit 32, one of the correction coefficient supplied from the area correction coefficient selecting circuit 34 and the recomputed correction coefficient supplied by the correction coefficient recomputation circuit 51 is selected (this operation will be explained in detail later), and the selected correction coefficient is supplied to the correction value computing circuit 35.

Similarly to the first embodiment, the correction value computing circuit 35 computes and outputs the correction value based on the peripheral pixels and the correction coefficients assigned thereto.

As described above, in the second embodiment of the present invention, each area is further divided into smaller areas, and correction coefficients assigned to the smaller areas are computed by extrapolation in accordance with the characteristic values of the distortion aberration characteristics.

The correction coefficient computing method as discussed in the first embodiment can be appropriately applied to the areas having a small variation in the characteristic values of the distortion aberration characteristics, specifically, the areas belonging to a central part of the image plane. However, the peripheral part of the image plane has a large variation in the characteristic values of the distortion aberration characteristics. Therefore, in the method in which the correction coefficients are stored in the correction coefficient table 41 of the area correction coefficient selecting circuit 34, if correction coefficients of high accuracy are to be stored (that is, if further smaller divided areas are defined and correction coefficients assigned thereto are determined and stored in advance), the amount of data of the correction coefficients to be stored is increased, thereby increasing the size of the correction coefficient table.

In the second embodiment of the present invention, in order to prevent the size of the correction coefficient table from increasing and to compute the correction coefficient with high accuracy, when processing the image signal with respect to the part having a large variation in the characteristic values of the distortion aberration characteristics, each relevant area assigned to the corresponding correction coefficient stored in the correction coefficient table is further divided into smaller areas, and a correction coefficient assigned to each divided area is computed. Therefore, even when using the optical system having the distortion aberration, defect pixel correction can be performed with high accuracy using the existing image sensor.

Of course, the central and peripheral parts of the image plane do not have to be discriminated, and every area of the image plane might be divided into smaller areas as described above.

Third Embodiment

Figure 15:
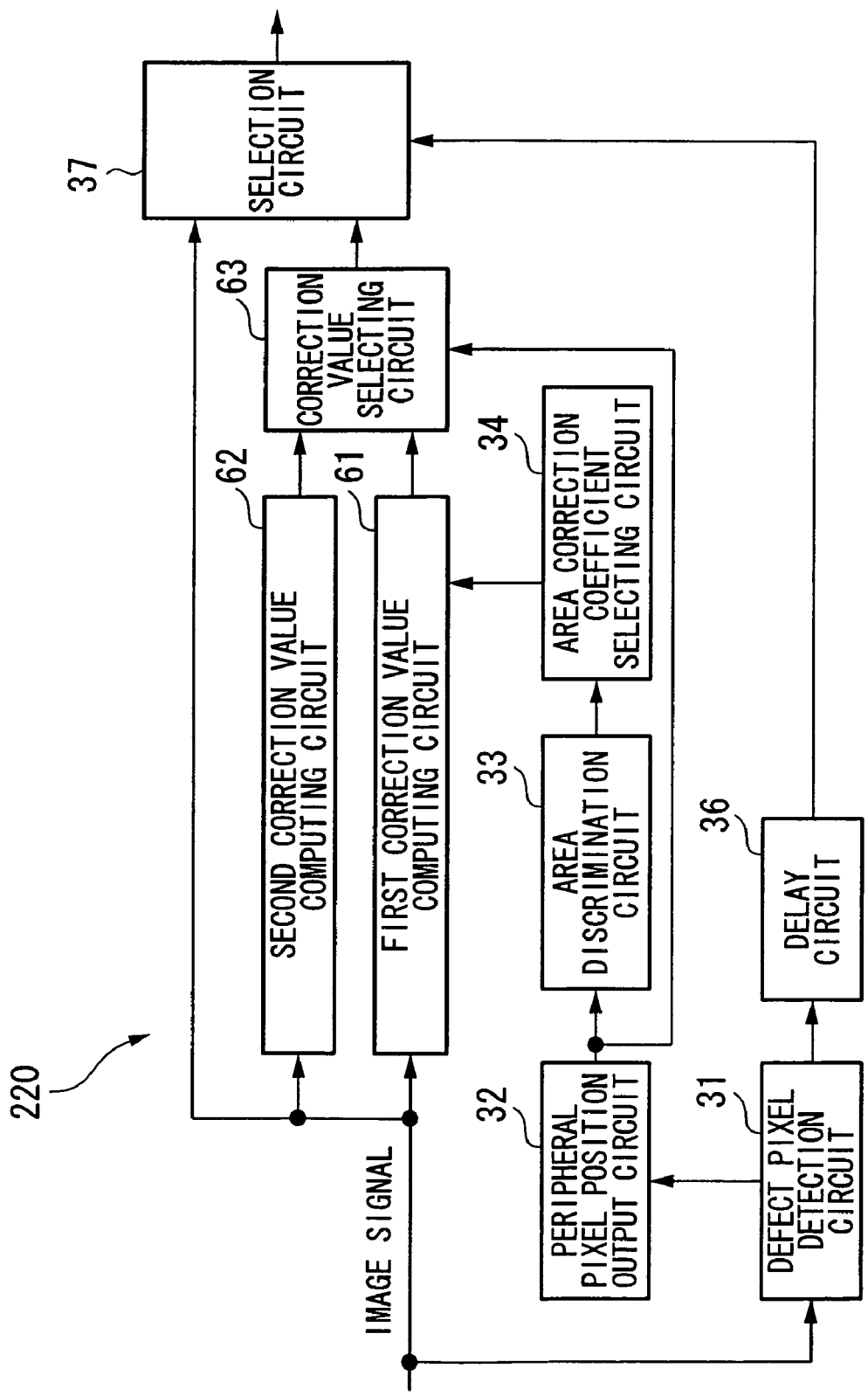
FIG. 15 is a block diagram showing the defect pixel correcting circuit as a third embodiment in accordance with the present invention.

FIG. 15 is a block diagram showing the structure of the defect pixel correcting circuit 220 of a third embodiment of the present invention. The general structure of the image capturing apparatus of the present embodiment is similar to those of the first and second embodiments, and parts identical to those of the first and second embodiments are given identical reference numerals. Therefore, explanations thereof are omitted.

In the third embodiment, in place of the correction value computing circuit 35 in the defect pixel correcting circuit 21 shown in FIG. 5, a first correction value computing circuit 61 and a second correction value computing circuit 62 are provided. The first correction value computing circuit 61 computes each defect pixel correction value through an operation using the image signal and the relevant correction coefficients, and the second correction value computing circuit 62 performs the correction without consideration of the distortion aberration characteristics. Based on the position of each peripheral pixel output from the peripheral pixel position output circuit 32, the correction value selecting circuit 63 selects one of a first computed correction value output from the first correction value computing circuit 61 and a second computed correction value output from the second correction value computing circuit 62, and outputs the selected value as the correction value.

Figure 16:
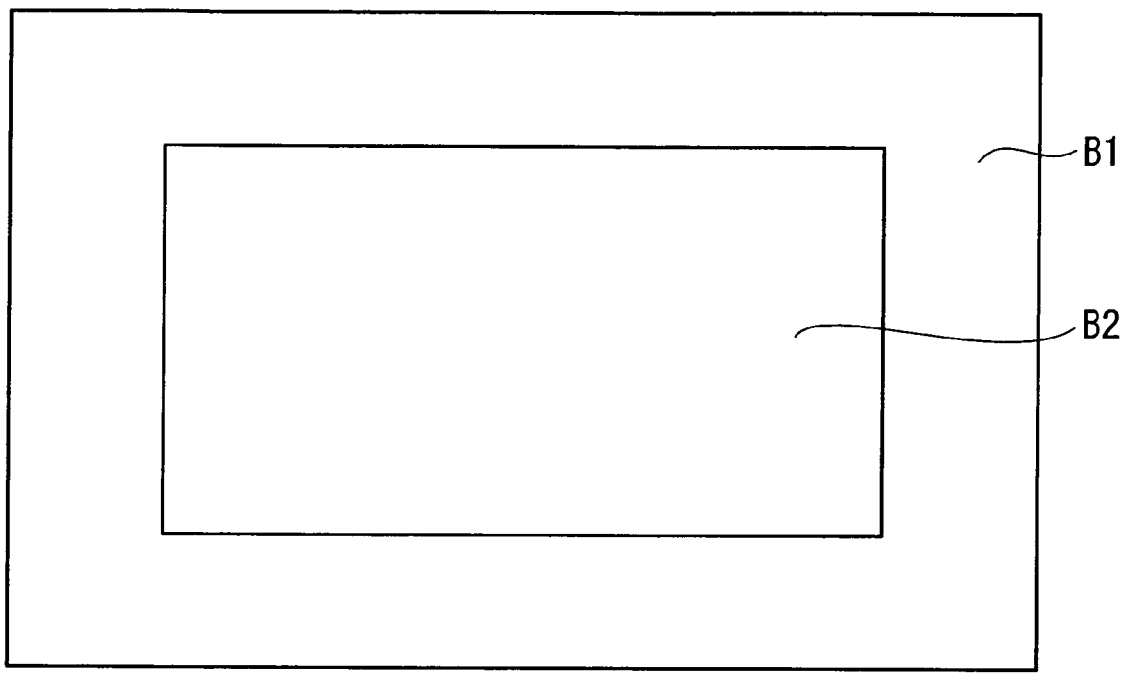
FIG. 16 is a diagram used for explaining area division performed in the third embodiment.

The defect pixel correcting circuit 220 of the third embodiment will be further explained. As shown in FIG. 16, in the third embodiment of the present invention, the image plane is divided roughly into a first area B1 belonging to a peripheral part and a second area B2 belonging to a central part. The first correction value computing circuit 61 in FIG. 15 computes correction values with respect to the first area B1 in consideration of the distortion aberration characteristics, and the second correction value computing circuit 62 computes correction values with respect to the second area B2 without consideration of the distortion aberration characteristics.

Based on the position of each peripheral pixel output from the peripheral pixel position output circuit 32, the correction value selecting circuit 63 selects one of the first and second computed correction values, and outputs the selected one as the correction value.

More specifically, the first correction value computing circuit 61 may compute the correction value based on peripheral pixels around the defect pixel, each belonging to the same color as that of the defect pixel, and on the correction coefficients assigned thereto, and outputs the computed correction value. That is, the correction value computing method identical to that in the first embodiment is employed.

In contrast, the second correction value computing circuit 62 may compute the correction value based on peripheral pixels around the defect pixel, each belonging to the same color as that of the defect pixel, by employing a simplified method.

Figure 17:
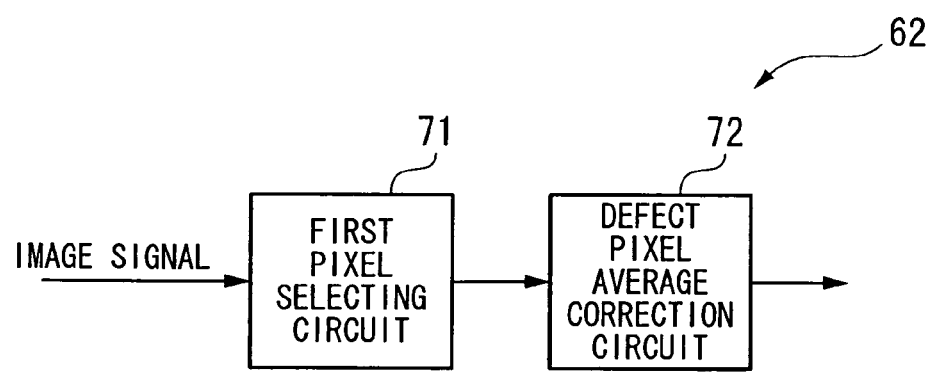
FIG. 17 is a block diagram showing an example of the second correction value computing circuit in the third embodiment.
Figure 18:
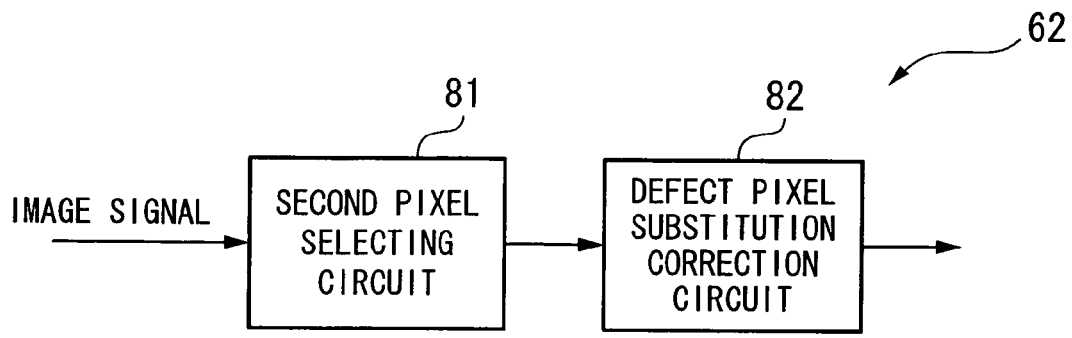
FIG. 18 is a block diagram showing another example of the second correction value computing circuit in the third embodiment.

The second correction value computing circuit 62 may have a structure as shown in FIG. 17 or 18.

Figure 19:
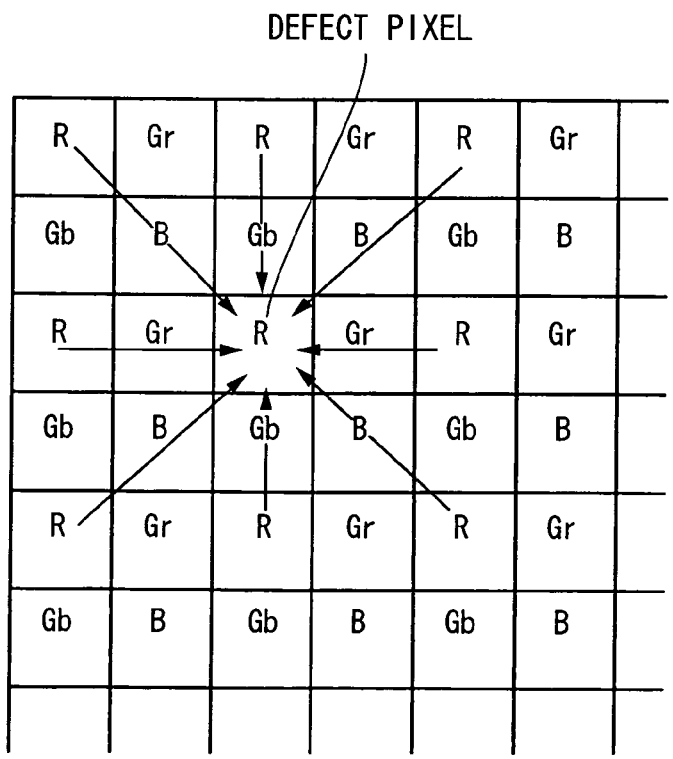
FIG. 19 is a diagram used for explaining an example of correction value computation performed by the second correction value computing circuit in the third embodiment.

The second correction value computing circuit 62 shown in FIG. 17 consists of a first pixel selecting circuit 71 and a defect pixel average correction circuit 72. As shown in FIG. 19, the first pixel selecting circuit 71 selects a plurality of peripheral pixels around the defect pixel, each being the same color as that of the defect pixel. The defect pixel average correction circuit 72 computes the correction value for the defect pixel by computing an average of the pixel values of these peripheral pixels of the same color.

Figures 20A, 20B:
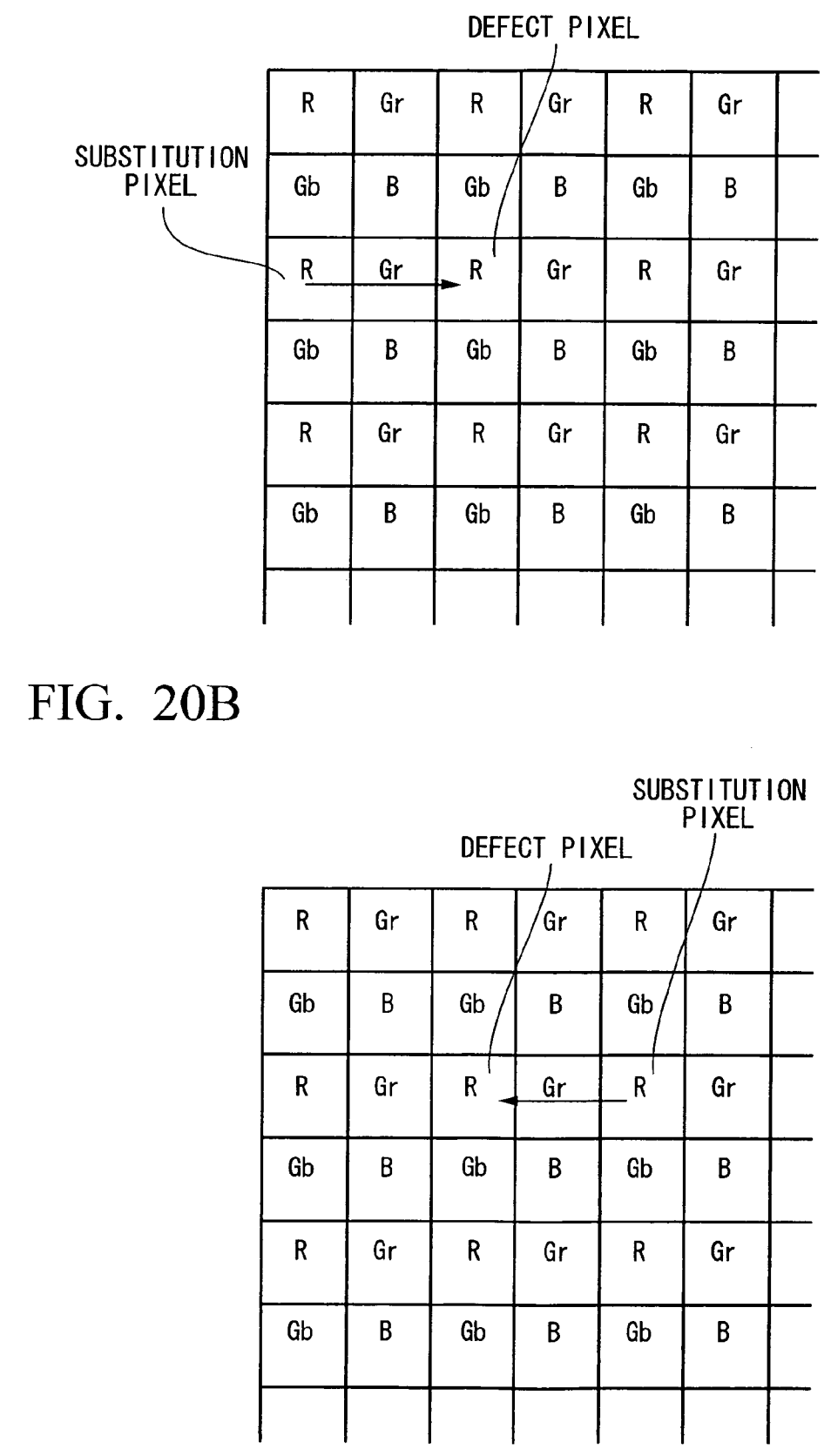

The second correction value computing circuit 62 shown in FIG. 18 consists of a second pixel selecting circuit 81 and a defect pixel substitution correction circuit 82. As shown in FIGS. 20A and 20B, the second pixel selecting circuit 81 selects a substitution pixel for performing front-end substitution or back-end substitution. The defect pixel substitution correction circuit 82 substitutes the pixel selected by the second pixel selecting circuit 81 for the defect pixel, and the pixel value of the selected pixel is output as the correction value.

In the central part of the image plane, a substantially uniform area is assigned to each pixel. Therefore, defect pixel correction can be performed with high accuracy even by the simplified method (i.e., a known method) as shown in FIG. 17 or 18, that is, without consideration of influence by the distortion aberration.

In FIG. 15, the correction value selecting circuit 63 selects: (i) the first computed correction value when the position of the peripheral pixel output from the peripheral pixel position output circuit 32 belongs to the first area B1, or (ii) the second computed correction value when the position of the peripheral pixel output from the peripheral pixel position output circuit 32 belongs to the second area B2.

As described above, in the present embodiment, simplified correction value computation is performed with respect to the area having a small distortion aberration (i.e., the second area B2), and correction value computation using the correction coefficients in accordance with the characteristic values of the distortion aberration characteristics is performed with respect to the area having a large distortion aberration (i.e., the first area B1). That is, defect pixel correction with respect to the central part of the image plane, which has a small distortion aberration, is simplified, thereby reducing the processing time, that is, the time necessary for image processing in electronic zooming, which uses such a central part of each image, can be reduced.

Fourth Embodiment

Figure 21:
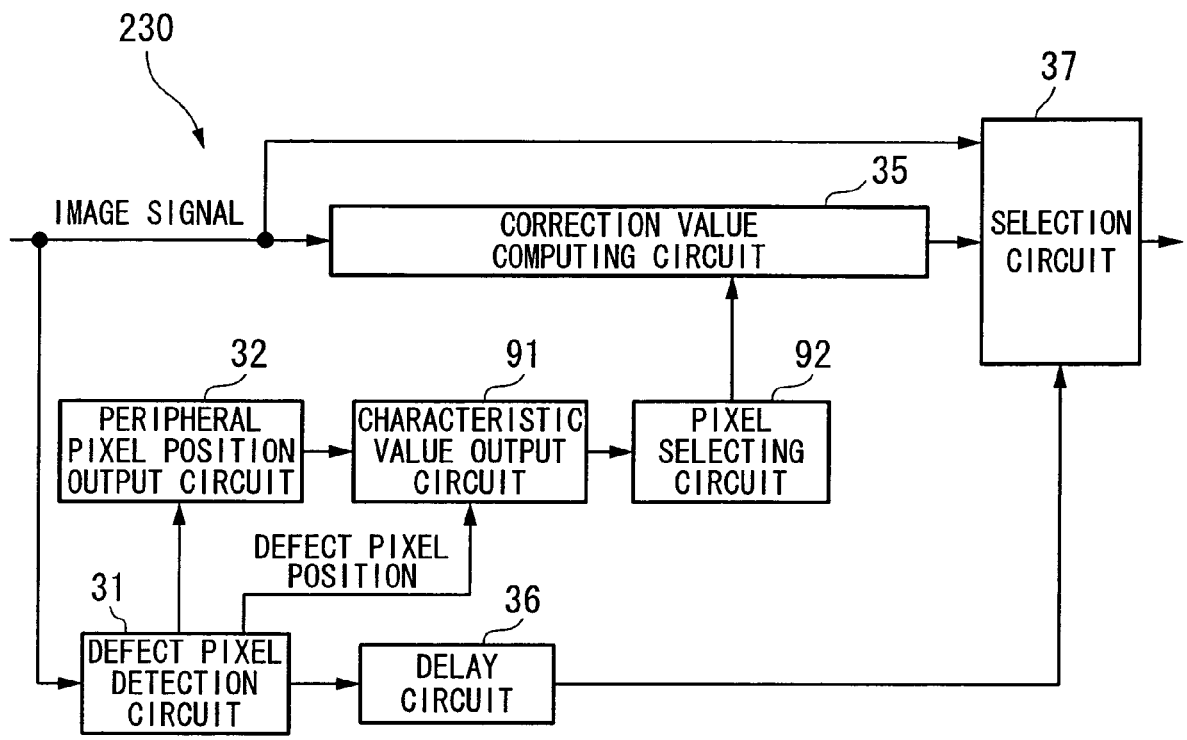
FIG. 21 is a block diagram showing the defect pixel correcting circuit as a fourth embodiment in accordance with the present invention.

FIG. 21 shows a fourth embodiment of the present invention. The general structure of the image capturing apparatus of the present embodiment is similar to those of the first to third embodiments, and parts identical to those of the first to third embodiments are given identical reference numerals. Therefore, explanations thereof are omitted.

As shown in FIG. 21, the defect pixel correcting circuit 230 of the fourth embodiment has a characteristic value output circuit 91 for outputting characteristic values assigned to the defect pixel and its peripheral positions with respect to the distortion aberration characteristics, and a pixel selecting circuit 92 for selecting a peripheral pixel as the substitution pixel based on these characteristic values.

Figure 22:
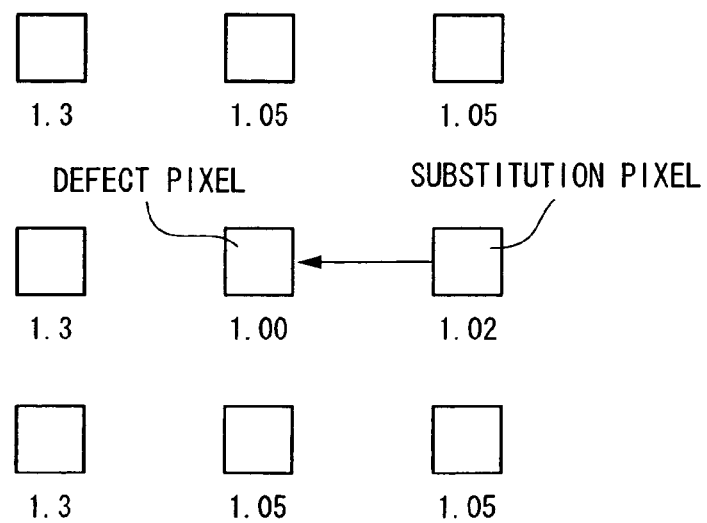
FIG. 22 is a diagram used for defect pixel correction performed in the fourth embodiment.

Each structural elements of the fourth embodiment will be explained below. FIG. 22 shows examples of the characteristic values with respect to the distortion aberration assigned to a defect pixel and its peripheral pixels. Each characteristic value is written below each pixel indicated by squares. As shown in FIG. 22, the characteristic values of the defect pixel and each peripheral pixel (belonging to the same color as that of the defect pixel) are compared with each other, so as to find one of the peripheral pixels for which the difference between the characteristic values of the defect pixel and the peripheral pixel is minimal. A signal for selecting that one of the peripheral pixels is output.

The characteristic values output from the characteristic value output circuit 91 may be computed based on the distortion aberration characteristics of the present optical system and the positions of each pixel, or may be stored in advance in a manner in which each pixel and its characteristic value correspond to each other.

Based on the signal output from the pixel selecting circuit 92, the correction value computing circuit 35 performs substitution of the image signal. Based on the selection signal sent through the delay circuit 36, the selection circuit 37 selects: (i) the image signal from the correction value computing circuit 35 in a case in which the original image signal (i.e., before the correction) relates to the defect pixel, or (ii) the original image signal in the other cases. In the substitution, the pixel having a characteristic value of the distortion aberration, which is closest to the characteristic value of the defect pixel (i.e., there is the minimum difference between both characteristic values) is substituted for the defect pixel. Therefore, it is possible to perform substitution correction with less error.

When performing defect pixel correction of an image obtained using the optical system having a large distortion aberration, if the correction is performed in consideration of this distortion aberration, it can be performed with higher accuracy in comparison with correction without consideration of the distortion aberration. Additionally, in comparison with the case of performing the defect pixel correction by executing an operation (using a formula), the circuit structure can be simplified.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In accordance with the first mode of the present invention, based on the image signal of the peripheral pixel with respect to the defect pixel and the correction coefficient relating to the peripheral pixel, the correction value with respect to the image signal of the defect pixel is computed; thus, it is possible to perform defect pixel correction with high accuracy and to improve the quality of images.

In addition, the correction coefficient is computed for each image area; thus, the structure of the image processing apparatus itself can be simplified. For example, each correction coefficient may be stored in a storage device such as an SDRAM in advance so that it can be retrieved later. In this case, the required capacity of the storage device can be reduced.

It is possible to provide:

a correction coefficient recomputation circuit for computing the correction coefficient assigned to a divided area obtained by further dividing an image area into smaller areas, based on the correction coefficient output from the area correction coefficient selecting circuit; and a correction coefficient selecting circuit for selecting one of the correction coefficient output from the area correction coefficient selecting circuit and the correction coefficient output from the correction coefficient recomputation circuit, based on the position of the peripheral pixel.

In this case, even when a peripheral part having a large distortion aberration is more finely divided into smaller areas so as to perform correction with high accuracy, the correction coefficients assigned to these areas can be obtained without increasing the size of the circuit.

It is also possible that:

the correction value computing circuit functions as a first correction value computing circuit, and the image processing apparatus further includes:

a second correction value computing circuit for computing the correction value based on a pixel value of the peripheral pixel, without using the correction coefficient; and a correction value selecting circuit for selecting one of the correction value output from the first correction value computing circuit and the correction value output from the second correction value computing circuit, based on the position of the peripheral pixel.

That is, the correction value selecting circuit for selecting one of the correction values computed using different methods is employed. In this case, in an area having a small distortion aberration, for example, in a central part of the image, the second correction value computing circuit can be used for reducing the processing time.

The second correction value computing circuit may have a pixel selecting circuit for selecting specific peripheral pixels from among peripheral pixels around the defect pixel; and a defect pixel average correction circuit for computing an average of the image signals of the selected peripheral pixels, and outputting the average as the correction value. In this case, the corrected pixel value can be obtained by computing an average of the image signals of the specific peripheral pixels which may belong to the same color as that of the defect pixel, so as to correct the defect pixel, thereby reducing the processing time.

The second correction value computing circuit may have a pixel selecting circuit for selecting a specific one of peripheral pixels around the defect pixel; and a defect pixel substitution correction circuit for outputting the image signal of the selected peripheral pixel as the correction value. In this case, the specific peripheral pixel which may belong to the same color as that of the defect pixel and be positioned before or after the defect pixel is selected, and the pixel value of this peripheral pixel is used as the image signal of the defect pixel, thereby reducing the processing time.

In accordance with the second mode of the present invention, one of the peripheral pixels which has the characteristic value producing the minimum difference between it and the characteristic value of the defect pixel is selected, and the image signal of the selected peripheral pixel is substituted for the image signal of the defect pixel. Therefore, a relatively simple circuit structure can be employed.

INDUSTRIAL APPLICABILITY

The present invention can be applied to defect correction of an image sensor when using an optical system having distortion aberration.

What is claimed is:

1. An image processing apparatus comprising:
an optical system having distortion aberration characteristics for expanding a central part and compressing a peripheral part of an image plane;
an image sensor for photodetecting an optical image via the optical system, converting the optical image to image signals, and outputting the image signals;

a correction coefficient output circuit for outputting a correction coefficient for correcting the image signal with respect to a defect pixel of the image sensor, wherein the correction coefficient is determined based on the distortion aberration characteristics and a position of a peripheral pixel around the defect pixel; and a correction value computing circuit for computing a correction value with respect to the image signal of the defect pixel, based on the image signal of the peripheral pixel and the correction coefficient; wherein the correction coefficient output circuit includes:

a defect pixel detection circuit for detecting the defect pixel;

a peripheral pixel position output circuit for outputting the position of the peripheral pixel with respect to the detected defect pixel;

an area discrimination circuit for outputting an area discrimination signal for indicating which of image areas the peripheral pixel belongs to based on the position of the peripheral pixel, wherein the image areas are defined by area division in accordance with the distortion aberration characteristics; and an area correction coefficient selecting circuit for outputting the correction coefficient corresponding to the area discrimination signal, from among the correction coefficients assigned to the image areas.

* * * * *